(12) United States Patent
Yoon et al.

(10) Patent No.: US 10,461,544 B2
(45) Date of Patent: Oct. 29, 2019

(54) METHOD FOR DIAGNOSING ERROR OF CELL BALANCING

(71) Applicant: HYUNDAI MOTOR COMPANY, Seoul (KR)

(72) Inventors: Jong Seo Yoon, Incheon (KR); Hyun Soo Park, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 483 days.

(21) Appl. No.: 15/156,894

(22) Filed: May 17, 2016

(65) Prior Publication Data

US 2017/0133864 A1 May 11, 2017

(30) Foreign Application Priority Data

Nov. 9, 2015 (KR) .......................... 10-2015-0157013

(51) Int. Cl.
| | | |
|---|---|---|
| *H01M 10/46* | (2006.01) | |
| *H02J 7/00* | (2006.01) | |
| *B60L 3/00* | (2019.01) | |
| *B60L 3/12* | (2006.01) | |
| *B60L 58/22* | (2019.01) | |

(52) U.S. Cl.
CPC .......... *H02J 7/0014* (2013.01); *B60L 3/0046* (2013.01); *B60L 3/12* (2013.01); *B60L 58/22* (2019.02); *H02J 7/0021* (2013.01); *B60L 2240/80* (2013.01); *Y02T 10/7005* (2013.01); *Y02T 10/7055* (2013.01); *Y02T 10/7061* (2013.01)

(58) Field of Classification Search
USPC .......................... 320/107, 116, 117, 118, 119
See application file for complete search history.

(56) References Cited

U.S. PATENT DOCUMENTS

| 10,057,928 B2 | 8/2018 | Masputra |
| 2010/0267368 A1 | 10/2010 | Masputra |
| 2014/0217982 A1* | 8/2014 | Ohkawa ............... H02J 7/0016 320/118 |

(Continued)

FOREIGN PATENT DOCUMENTS

| KR | 10-2009-0062339 A | 6/2009 |
| KR | 10-2010-0035771 A | 4/2010 |

(Continued)

OTHER PUBLICATIONS

Notice of Allowance issued in Korean Application No. 10-2015-0157013 dated Dec. 19, 2016.

*Primary Examiner* — Edward Tso
(74) *Attorney, Agent, or Firm* — Morgan, Lewis & Bockius LLP

(57) ABSTRACT

A method for diagnosing an error of cell balancing in a cell balancing circuit constantly maintaining a plurality of cell voltages of a battery includes a first step of calculating a cell balancing residual time through a cell balancing required time and a cell balancing performing time in a previous driving, a second step of confirming a cell balancing required time in a current driving after the first step, a third step of calculating a time deviation between the cell balancing required time of the second step and the cell balancing residual time of the first step, and a fourth step of deciding whether or not the error has occurred through the time deviation calculated in the third step.

9 Claims, 1 Drawing Sheet

(56) References Cited

U.S. PATENT DOCUMENTS

2014/0330463 A1  11/2014  Jeong

FOREIGN PATENT DOCUMENTS

| KR | 10-2012-0004527 A | 1/2012 |
| KR | 10-1103861 B1 | 1/2012 |
| KR | 10-2014-0061840 A | 5/2014 |
| KR | 10-2014-0062335 A | 5/2014 |
| KR | 10-1461895 B1 | 11/2014 |

* cited by examiner

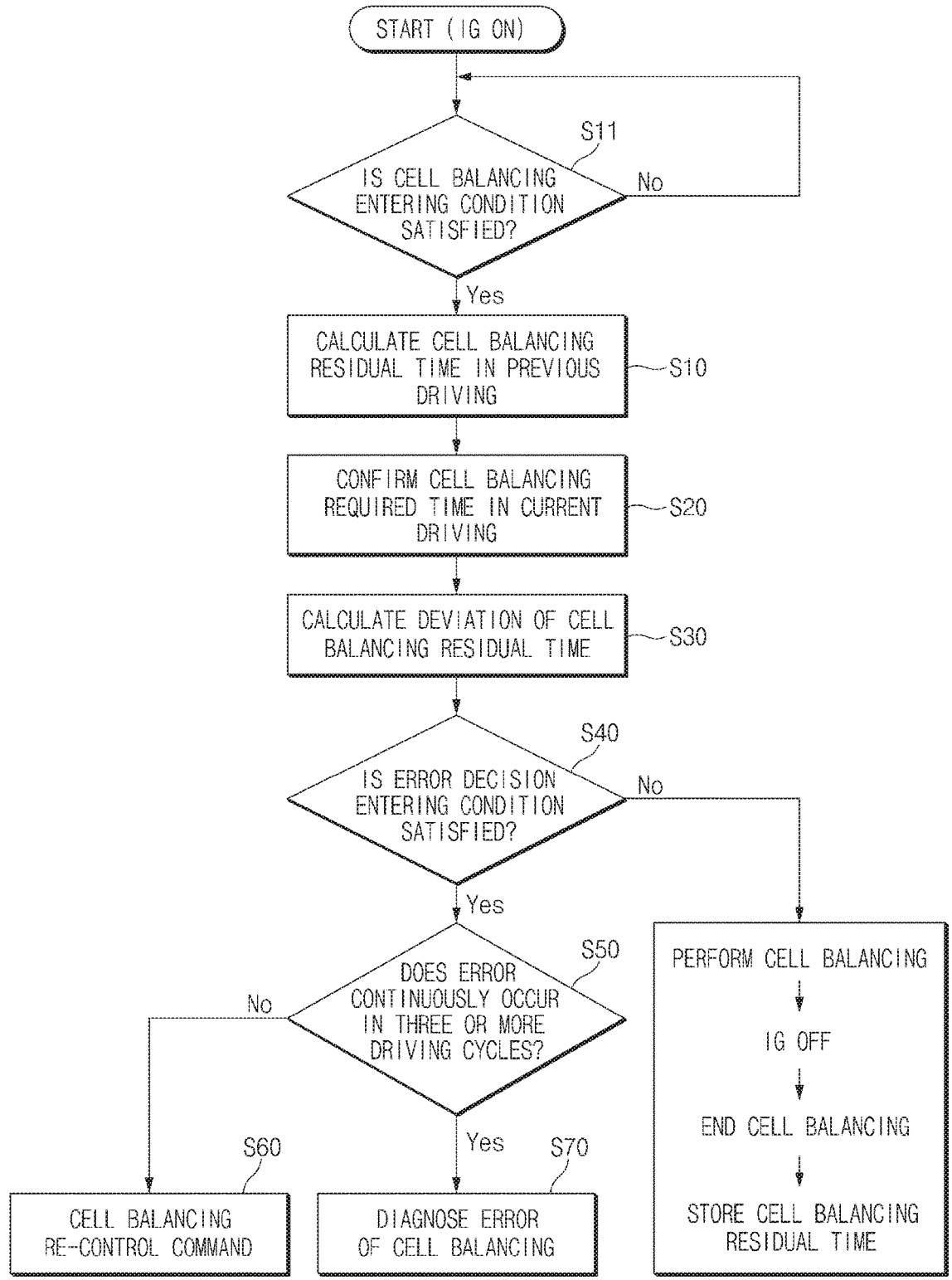

METHOD FOR DIAGNOSING ERROR OF CELL BALANCING

CROSS-REFERENCE TO RELATED APPLICATION

This application claims the benefit of priority to Korean Patent Application No. 10-2015-0157013, filed on Nov. 9, 2015 with the Korean Intellectual Property Office, the disclosure of which is incorporated herein in its entirety by reference.

TECHNICAL FIELD

The present disclosure relates to a method for diagnosing an error of cell balancing, and more particularly, to a method for diagnosing an error of cell balancing capable of diagnosing an operation error of the cell balancing by calculating a time deviation between a cell balancing residual time calculated in the previous driving and a cell balancing required time in current driving.

BACKGROUND

Generally, a vehicle using an internal combustion engine consuming gasoline or heavy oil as a main fuel has an effect on air pollution.

Therefore, in order to reduce the generation of the pollution, many efforts to develop an electric vehicle or a hybrid vehicle have been made.

The electric vehicle is a vehicle using a battery motor operated by electric energy output from a battery.

Since the electric vehicle uses the battery in which a plurality of secondary cells that are rechargeable are formed as one pack as a main power source, the electric vehicle has an advantage that exhaust gas is not present and noise is reduced.

Meanwhile, the hybrid vehicle, which is a vehicle in an intermediate stage between the vehicle using the internal combustion engine and the electric vehicle, is a vehicle using two or more power sources, for example, an internal combustion engine and an electric battery.

Currently, a hybrid vehicle using the internal combustion engine and a fuel cell directly obtaining electrical energy by generating a chemical reaction while continuously supplying hydrogen and oxygen or using a battery and a fuel cell has been developed.

In the vehicle using the battery motor as described above, the number of secondary cells has been gradually increased in order to improve a power source, and a method for controlling cell balancing capable of efficiently managing a plurality of cells and packs connected to each other is required in a battery management system (BMS).

Currently, in a commercial vehicle, when a relay is connected to battery packs used in the electric vehicle in order to supply a large amount of power, a voltage difference between the battery packs may be naturally balanced.

However, in the related art, it is difficult to control cell balancing, such that a voltage deviation between cells in the battery pack may not be narrowed, and when charging and discharging of the battery are conducted in a situation in which the voltage deviation between the cells in the battery pack is generated, the voltage deviation between the cells in the battery pack is intensified.

SUMMARY

The present disclosure has been made to solve the above-mentioned problems occurring in the prior art while advantages achieved by the prior art are maintained intact.

An aspect of the present disclosure provides a method for diagnosing an error of cell balancing capable of diagnosing an operation error of the cell balancing by calculating a time deviation between a cell balancing residual time calculated in the previous driving and a cell balancing required time in current driving.

According to an exemplary embodiment of the present disclosure, a method for diagnosing an error of cell balancing in a cell balancing circuit constantly maintaining a plurality of cell voltages of a battery includes: a first step of calculating a cell balancing residual time through a cell balancing required time in a previous driving and a cell balancing performing time; a second step of confirming a cell balancing required time in a current driving after the first step; a third step of calculating a time deviation between the cell balancing required time of the second step and the cell balancing residual time of the first step; and a fourth step of deciding whether or not the error has occurred through the time deviation calculated in the third step.

The method for diagnosing an error of cell balancing may further include, before the first step, a 1-1-th step of deciding a cell balancing entering condition indicating whether or not a minimum cell voltage and a voltage deviation between different cells are at predetermined levels or more.

In the first step, the cell balancing residual time may be calculated by subtracting the cell balancing performing time from the cell balancing required time.

In the third step, the time deviation may be calculated by subtracting the cell balancing residual time from the cell balancing required time.

In the fourth step, it may be decided that the cell balancing is normal in the case in which the time deviation is in a predetermined range, and it may be decided that the cell balancing is abnormal in the case in which the time deviation exceeds the predetermined range.

In the predetermined range, it may be decided that the cell balancing is not operated when the time deviation is 90% or more on the basis of the cell balancing performing time, and it may be decided that the cell balancing is excessively operated when the time deviation is −300% or less on the basis of the cell balancing performing time.

It may be decided that the cell balancing is normally operated when the time deviation exceeds −300% and is less than 90% on the basis of the cell balancing performing time.

The method for diagnosing an error of cell balancing may further include, after the fourth step, a fifth step of deciding whether or not the error continuously occurs in three driving cycles when it is decided that the error has occurred.

The method for diagnosing an error of cell balancing may further include: a sixth step of re-controlling the cell balancing in the case in which the error does not continuously occur in the three driving cycles in the fifth step; and a seventh step of diagnosing that the error of the cell balancing has occurred in the case in which the error continuously occurs in the three driving cycles in the fifth step.

In the case in which the error does not occur in the fourth step, a cell balancing performing step, an IG OFF step, a cell balancing ending step, and a cell balancing residual time storing step may be performed.

According to another exemplary embodiment of the present disclosure, a method for diagnosing an error of cell balancing in a cell balancing circuit constantly maintaining a plurality of cell voltages of a battery includes: a first step of calculating a cell balancing residual time by subtracting a cell balancing performing time from a cell balancing required time in a previous driving when a cell balancing entering condition indicating whether or not a minimum cell voltage and a voltage deviation between different cells are at predetermined levels or more is satisfied after a 1-1-th step of deciding the cell balancing entering condition; a second step of confirming a cell balancing required time in a current driving after the first step; a third step of calculating a time deviation by subtracting the cell balancing residual time of the first step from the cell balancing required time of the second step; and a fourth step of deciding whether or not the error has occurred by deciding that the cell balancing is normal in the case in which the time deviation calculated in the third step is in a predetermined range and deciding that the cell balancing is abnormal in the case in which the time deviation exceeds the predetermined range.

In the fourth step, when the time deviation is determined to be in the predetermined range, it may be decided that the cell balancing is not operated when the time deviation is 90% or more on the basis of the cell balancing performing time, it may be decided that the cell balancing is excessively operated when the time deviation is −300% or less on the basis of the cell balancing performing time, and it may be decided that the cell balancing is normally operated when the time deviation exceeds −300% and is less than 90% on the basis of the cell balancing performing time.

BRIEF DESCRIPTION OF THE DRAWINGS

The above and other objects, features and advantages of the present disclosure will be more apparent from the following detailed description taken in conjunction with the accompanying drawings.

FIG. 1 is a flow chart illustrating a method for diagnosing an error of cell balancing according to an exemplary embodiment of the present disclosure.

DETAILED DESCRIPTION

Exemplary embodiments of the present disclosure will be described in detail with reference to the accompanying drawings.

A method for diagnosing an error of cell balancing according to an exemplary embodiment of the present disclosure may include a first step (S10) of calculating a cell balancing residual time in a previous driving in a cell balancing circuit, a second step (S20) of confirming a cell balancing required time in current driving, a third step (S30) of calculating a time deviation between the cell balancing required time and the cell balancing residual time, and a fourth step (S40) of deciding whether or not an error has occurred through the time deviation, as illustrated in FIG. 1.

Cell balancing means that a plurality of cell voltages of a battery for a hybrid vehicle are constantly maintained, and the present disclosure relates to a method for diagnosing an error of cell balancing.

As illustrated in FIG. 1, the first step (S10) may be a step of calculating the cell balancing residual time through a cell balancing required time and a cell balancing performing time in the previous driving of the vehicle.

Here, in the first step (S10), the cell balancing residual time may be calculated by subtracting the cell balancing performing time from the cell balancing required time.

Meanwhile, a process may pass through a 1-1-th step (S11) of deciding a cell balancing entering condition indicating whether or not a minimum cell voltage and a voltage deviation between different cells are at predetermined levels or more before the first step (S10), and proceeding to the first step (S10) when the cell balancing entering condition is satisfied.

The second step (S20) may be a step of confirming the cell balancing required time in current driving after the first step (S10).

The third step (S30) may be a step of calculating the time deviation between the cell balancing required time of the second step (S20) and the cell balancing residual time of the first step (S10).

Here, in the third step (S30), the time deviation may be calculated by subtracting the cell balancing residual time from the cell balancing required time.

The fourth step (S40) may be a step of deciding whether or not the error has occurred through the time deviation calculated in the third step (S30).

Here, in the fourth step (S40), it may be decided that the cell balancing is normal in the case in which the time deviation is in a predetermined range and it may be decided that the cell balancing is abnormal in the case in which the time deviation exceeds the predetermined range.

Here, in the predetermined range for deciding normality and abnormality, it may be decided that the cell balancing is not operated when the time deviation is 90% or more on the basis of the cell balancing performing time, it may be decided that the cell balancing is excessively operated when the time deviation is −300% or less on the basis of the cell balancing performing time, and it may be decided that the cell balancing is normally operated when the time deviation exceeds −300% and is less than 90% on the basis of the cell balancing performing time.

Table 1 represents diagnosis of an error of cell balancing related to time deviation.

TABLE 1

|  | Previous Driving | | | Current Driving | | |
| --- | --- | --- | --- | --- | --- | --- |
|  | Cell Balancing Required Time | Cell Balancing Performing Time | Cell Balancing Residual Time | Cell Balancing Required Time | Time Deviation of Residual Time | Decision of Whether or not Error Occurs |
| Cell 1 | 0 sec | 300 sec | 0 sec | 0 sec | 0 sec(0%) | Normal |
| Cell 2 | 500 sec |  | 200 sec | 200 sec | 0 sec(0%) | Normal |
| Cell 3 | 400 sec |  | 100 sec | 70 sec | −30 sec(−10%) | Normal |
| Cell 4 | 1000 sec |  | 700 sec | 980 sec | +280 sec(+93%) | Cell Balancing is not operated |
| Cell 5 | 1200 sec |  | 900 sec | 0 sec | −900 sec(−300%) | Cell Balancing is excessively operated |

Meanwhile, a process may proceed to a fifth step (S50) of deciding whether or not the error of the cell balancing continuously occurs in three driving cycles when it is decided that the error of the cell balancing occurs after the fourth step (S40), thereby confirming whether the error of the cell balancing is a logic error caused by software or an error caused by hardware.

Here, the method for diagnosing an error of cell balancing may further include a sixth step (S60) of re-controlling the cell balancing in the case in which the error of the cell balancing does not continuously occur in the three driving cycles in the fifth step (S50) and a seventh step (S70) of finally diagnosing that the error of the cell balancing occurs in the case in which the error of the cell balancing continuously occurs in the three driving cycles in the fifth step (S50).

That is, in the case in which the error of the cell balancing occurs in driving cycles of less than the three driving cycles, it may be decided that the error of the cell balancing is a control logic error caused by the software, thereby making it possible to re-control the cell balancing. In the case in which the error of the cell balancing continuously occurs in the three or more driving cycles, it may be decided that the error of the cell balancing is an error of cell balancing caused by the hardware, thereby making it possible to inform a driver of the error through a service lamp.

In the present disclosure, performance of the cell balancing may be re-driven or forcibly ended through an operation control at the time of detecting an abnormal operation of the cell balancing, thereby making it possible to prevent a circuit from being burned due to a high temperature and ensure a normal operation of the cell balancing.

Meanwhile, in the case in which the error of the cell balancing does not occur in the fourth step (S40), a cell balancing performing step, an IG OFF step, a cell balancing ending step, and a cell balancing residual time storing step may be performed.

As described above, the method for diagnosing an error of cell balancing according to an exemplary embodiment of the present disclosure in a cell balancing circuit constantly maintaining the plurality of cell voltages of the battery for a hybrid vehicle may include the first step (S10) of calculating the cell balancing residual time by subtracting the cell balancing performing time in the previous driving from the cell balancing required time in the previous driving when the cell balancing entering condition is satisfied after the 1-1-th step (S11) of deciding the cell balancing entering condition indicating whether or not the minimum cell voltage and the voltage deviation between the different cells are at the predetermined levels or more, the second step (S20) of confirming the cell balancing required time in the current driving after the first step (S10), the third step (S30) of calculating the time deviation by subtracting the cell balancing residual time of the first step (S10) from the cell balancing required time of the second step (S20), and the fourth step (S40) of deciding whether or not the error has occurred by deciding that the cell balancing is normal in the case in which the time deviation calculated in the third step (S30) is in the predetermined range and deciding that the cell balancing is abnormal in the case in which the time deviation exceeds the predetermined range.

As described above, according to the exemplary embodiment of the present disclosure, since it may be diagnosed whether or not the cell balancing operation is abnormal using an existing logic without adding separate hardware, stability of the control of the cell balancing may be secured, it may be decided whether the error of the cell balancing is an error due to the logic error of the software or an error due to abnormality of the hardware, the performance of the cell balancing is forcibly ended at the time of occurrence of the error to prevent a component from being burned or ignited due to a high temperature, thereby making it possible to increase stability, and an excessive deviation between cell voltages due to a malfunction of a cell balancing logic or circuit is prevented to prevent deterioration of performance of a battery pack and improve marketability.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for diagnosing an error in a cell balancing circuit configured to constantly maintain a plurality of cell voltages of a battery, comprising:
    a first step of calculating a cell balancing residual time ($trd\_1$) based on a cell balancing required time ($trq\_1$) and a cell balancing performing time ($tpf\_1$) in a previous driving;
    a second step of confirming a cell balancing required time ($trq\_2$) in a current driving after the first step;
    a third step of calculating a time deviation ($tdev$) based on the cell balancing required time ($trq\_2$) of the second step and the cell balancing residual time ($trd\_1$) of the first step;
    a fourth step of deciding whether or not an error has occurred in the cell balancing circuit based on a ratio between the time deviation ($tdev$) and the cell balancing performing time ($tpf\_1$); and
    a fifth step of operating the cell balancing circuit in a case in which the error does not occur in the fourth step,
    wherein in the fourth step, it is decided that the error has occurred in the cell balancing circuit when the ratio between the time deviation ($tdev$) and the cell balancing performing time ($tpf\_1$) satisfies any one of following ranges:

$$\frac{t_{dev}}{t_{pf}-1} \times 100(\%) \le -A, \; B \le \frac{t_{dev}}{t_{pf}-1} \times 100(\%) \; (A, B > 0).$$

2. The method of claim 1, further comprising, before the first step:
    a step of deciding a cell balancing entering condition indicating whether or not a minimum cell voltage and a voltage deviation between different cells are at predetermined levels or more.

3. The method of claim 1, wherein in the first step, the cell balancing residual time ($trd\_1$) is calculated by subtracting the cell balancing performing time ($tpf\_1$) from the cell balancing required time ($trq\_1$).

4. The method of claim 1, wherein in the third step, the time deviation ($tdev$) is calculated by subtracting the cell balancing residual time ($trd\_1$) from the cell balancing required time ($trq\_2$).

5. The method of claim 1, wherein in the fourth step, it is decided that the cell balancing circuit is not operated when $$90(\%) \le \frac{t_{dev}}{t_{pf}-1} \times 100(\%),$$

and it is decided that the cell balancing circuit is excessively operated when $$\frac{t_{dev}}{t_{pf}-1} \times 100(\%) \le -300(\%).$$

6. The method of claim 1, further comprising, after the fourth step:
a sixth step of deciding whether or not the error continuously occurs in three driving cycles when it is decided that the error has occurred in the fourth step.

7. The method of claim 6, further comprising:
a seventh step of re-controlling the cell balancing circuit in a case in which the error in the cell balancing circuit does not continuously occur in the three driving cycles in the fifth step.

8. A method for diagnosing an error in a cell balancing circuit configured to constantly maintain a plurality of cell voltages of a battery, comprising:
a first step of deciding a cell balancing entering condition indicating whether or not a minimum cell voltage and a voltage deviation between different cells are at predetermined levels or more is satisfied;
a second step of calculating a cell balancing residual time (trd_1) by subtracting a cell balancing performing time (tpf_1) in a previous driving from a cell balancing required time (trq_1) in the previous driving;
a third step of confirming a cell balancing required time (trq_2) in current driving after the first step;
a fourth step of calculating a time deviation (tdev) by subtracting the cell balancing residual time (trd_1) of the first step from the cell balancing required time (trq_2) of the second step;
a fifth step of deciding whether or not an error has occurred in the cell balancing circuit based on a ratio between the time deviation (tdev) and the cell balancing performing time (tpf_1); and
a sixth step of operating the cell balancing circuit in a case in which the error does not occur in the fifth step,
wherein in the fourth step, it is decided that the error has occurred in the cell balancing circuit when the ratio between the time deviation (tdev) and the cell balancing performing time (tpf_1) satisfies any one of following ranges:

$$\frac{t_{dev}}{t_{pf}-1} \times 100(\%) \le -A, B \le \frac{t_{dev}}{t_{pf}-1} \times 100(\%) \ (A, B > 0).$$

9. The method of claim 8, wherein in the fifth step, it is to decided that the cell balancing circuit is not operated when $$90(\%) \le \frac{t_{dev}}{tpf_1} \times 100(\%),$$

and it is decided that the cell balancing circuit is excessively operated when $$\frac{t_{dev}}{tpf_1} \times 100(\%) \le -300(\%).$$

* * * * *